H. SCHÜTTE.
CURRENT COLLECTOR FOR ELECTRIC RAILWAYS.
APPLICATION FILED JULY 14, 1910.

1,159,536.

Patented Nov. 9, 1915.
4 SHEETS—SHEET 1.

H. SCHÜTTE.
CURRENT COLLECTOR FOR ELECTRIC RAILWAYS.
APPLICATION FILED JULY 14, 1910.
1,159,536.
Patented Nov. 9, 1915.
4 SHEETS—SHEET 4.
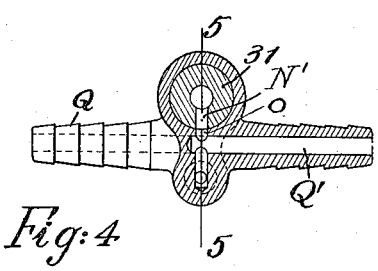
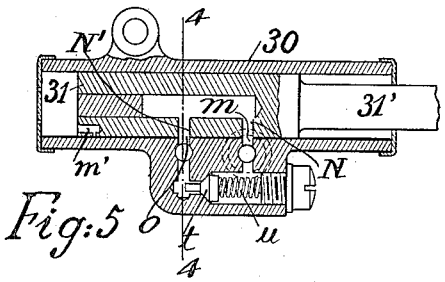
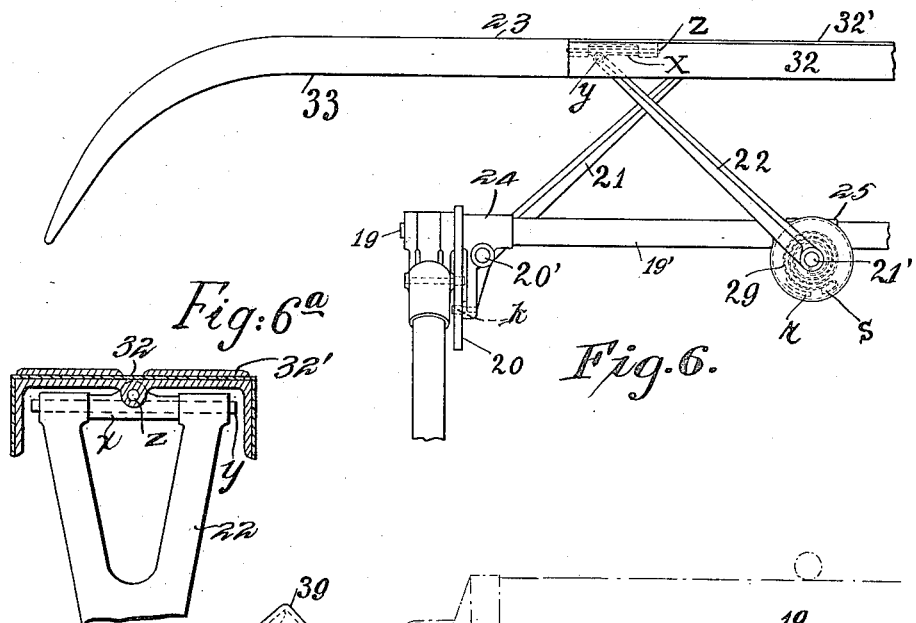
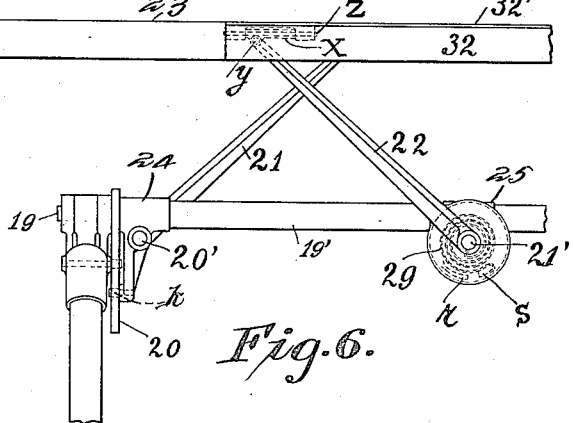
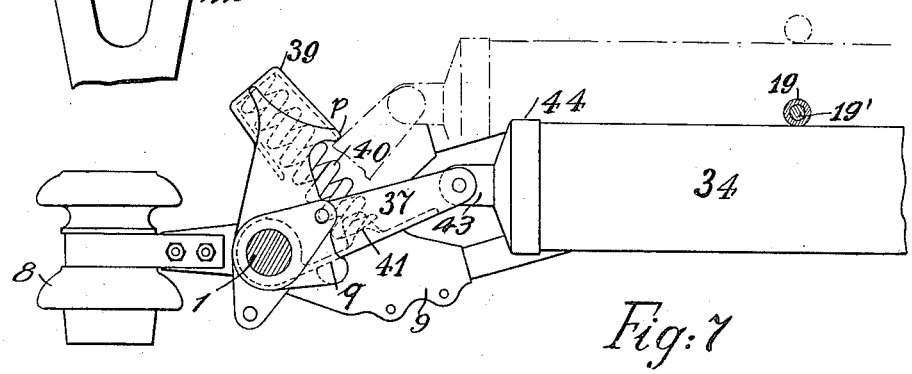

UNITED STATES PATENT OFFICE.

HERMANN SCHÜTTE, OF PITTSBURGH, PENNSYLVANIA, ASSIGNOR TO SCHUTTE ELECTRIC COMPANY, OF PITTSBURGH, PENNSYLVANIA, A CORPORATION OF PENNSYLVANIA.

CURRENT-COLLECTOR FOR ELECTRIC RAILWAYS.

1,159,536.     Specification of Letters Patent.     Patented Nov. 9, 1915.

Application filed July 14, 1910. Serial No. 571,911.

*To all whom it may concern:*

Be it known that I, HERMANN SCHÜTTE, a subject of the Emperor of Germany, residing at Pittsburgh, in the county of Allegheny and State of Pennsylvania, have invented a new and useful Improvement in Current-Collectors for Electric Railways, of which improvement the following is a specification.

My invention relates to improvements in current collectors for electric railway vehicles, more particularly to such devices which collect the current supply from an overhead conductor or trolley wire, and especially applicable to high speed service and heavy current loads.

The objects of my invention are, first, to produce a device of this character having a contact member or members with high natural period of vibration to closely follow the wire at high speed; secondly, to provide sufficient contact surface for heavy current loads; thirdly, to reduce the pressure or tension upon the trolley wire to a practical minimum; fourthly, to produce a laterally shifting contact shoe, the use of which will avoid the liability to wear the shoe at a fixed point and thus make staggering of the wire unnecessary; fifthly, to provide a plurality of contact members, for the purpose if one of them leaves the wire for an instant another will be in contact with the wire and thus prevent sparking; sixthly, providing means to produce a predetermined uniform pressure upon the wires; seventhly, to provide means to regulate the pressure exerted to extend the main frame to correspond with said predetermined pressure upon the trolley wire; eighthly, to provide means controlled by the contact member or members to hold or maintain the frame in a fixed position with relation to the trolley wire; ninthly, to provide suitable passage for fluid pressure from the roof of the car or locomotive to a regulating means operated by the contact member or members and from said regulating means to the operating cylinder; tenthly, to provide a fluid pressure operated current collector with means to prevent its operation being affected by fluctuations in the supply tank pressure, and other novel features of construction. I accomplish these objects by means of the apparatus hereinafter described, reference being had to the accompanying drawings, forming part hereof, in which—

Figure 1:
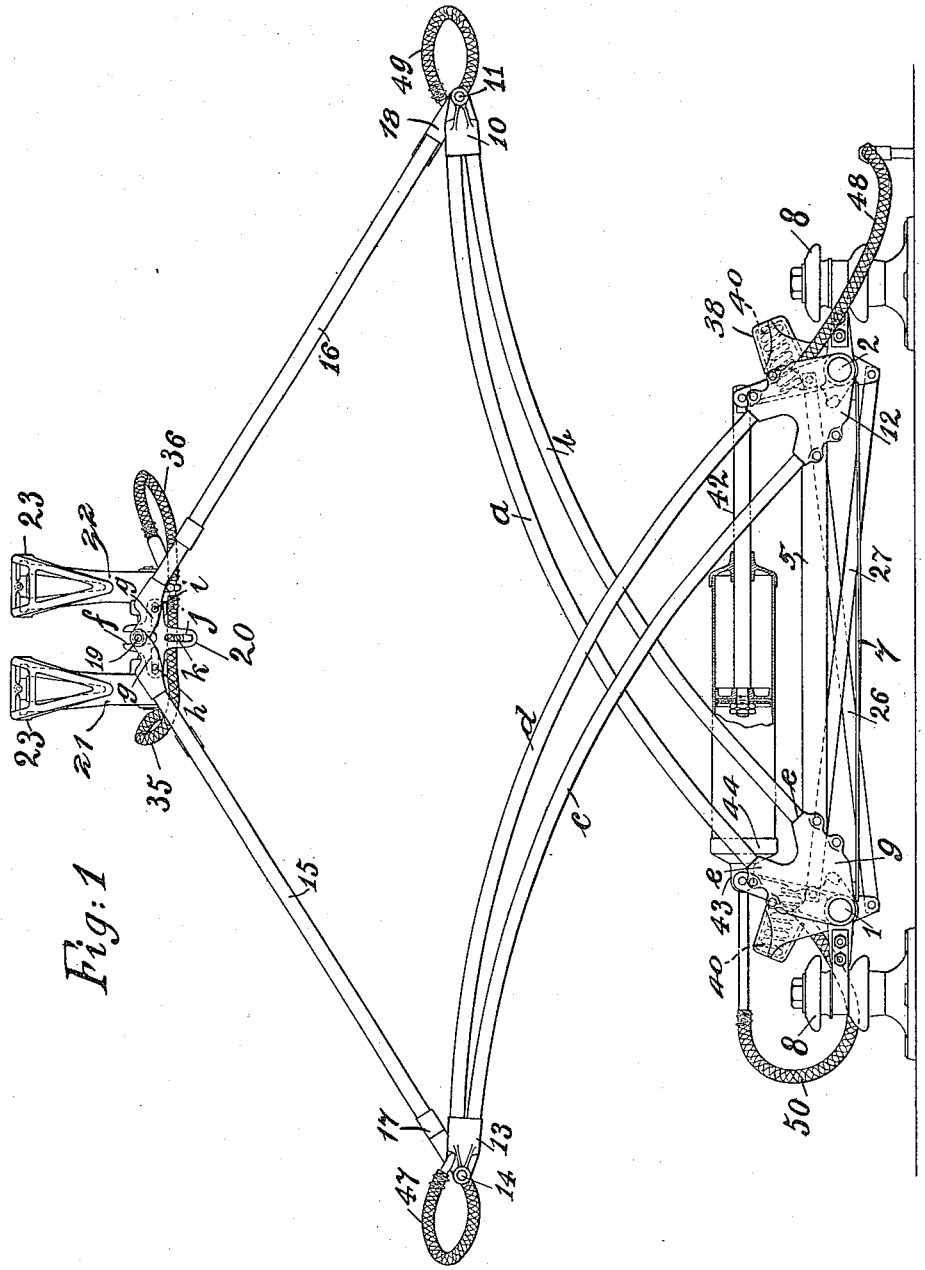
Figure 2:
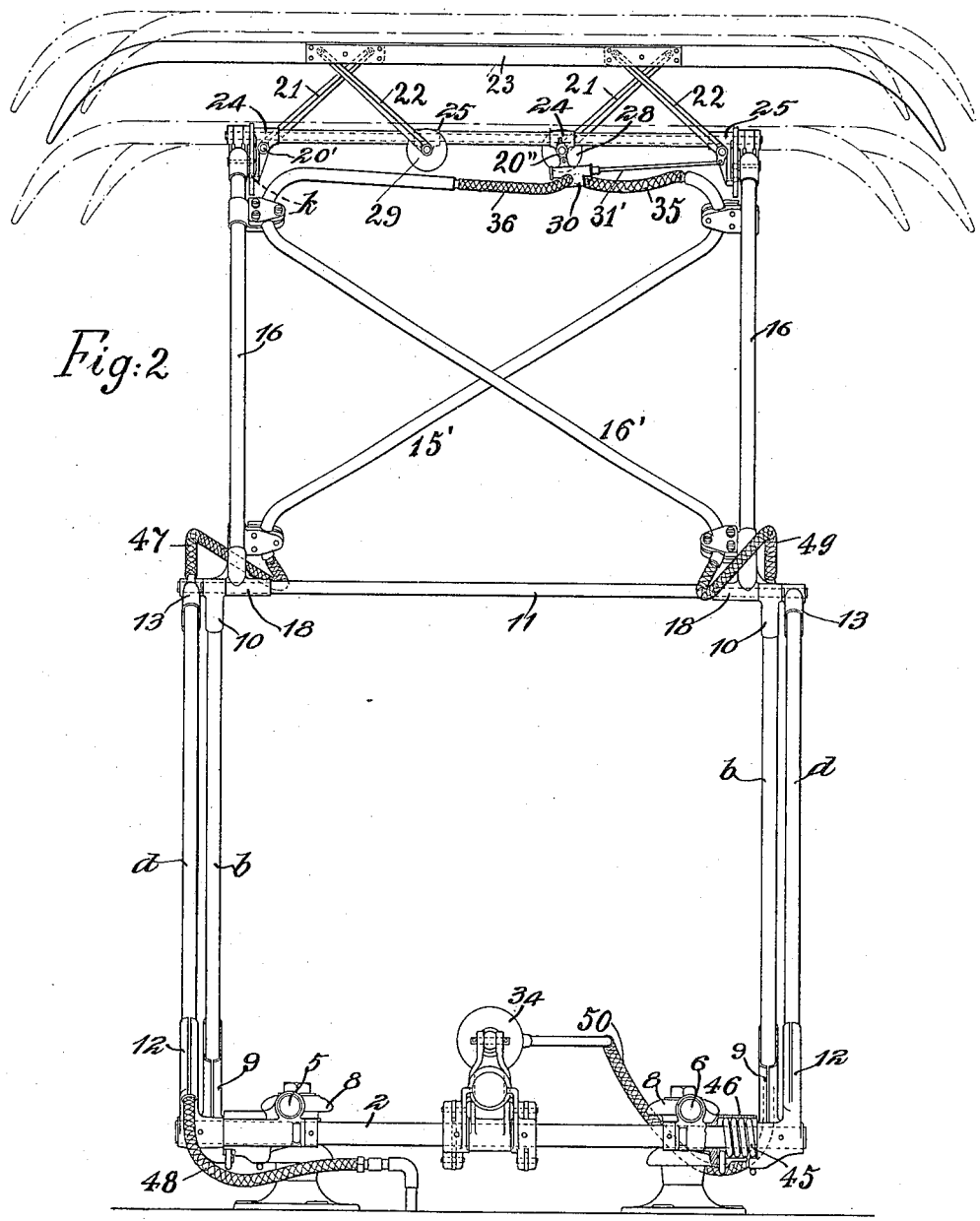
Figure 3:
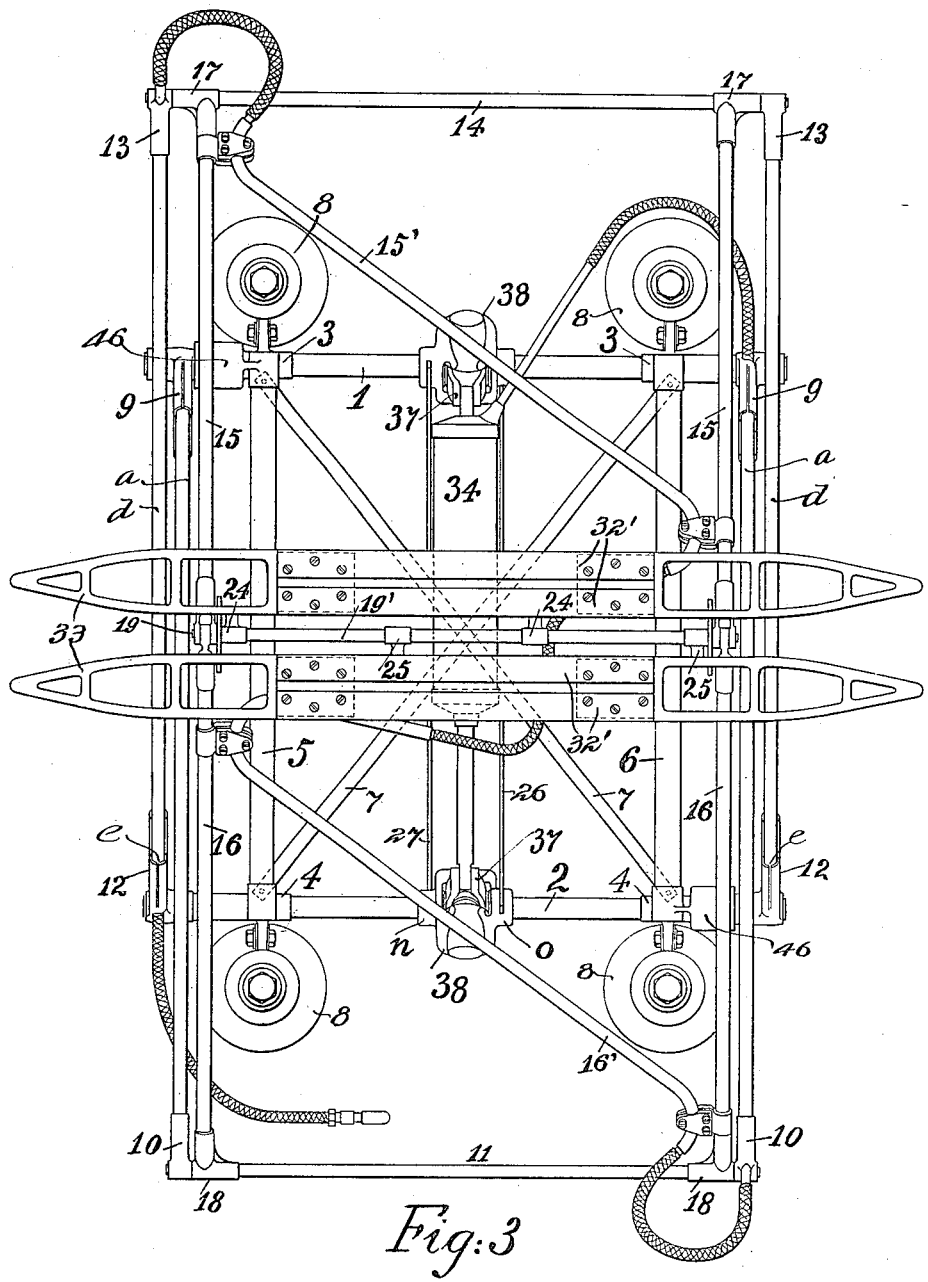

Figure 1 is a longitudinal elevation of my improved apparatus. Fig. 2 is an end elevation of the same. Fig. 3 is a plan view of the same. Fig. 4 is a transverse view, partly in section, of the pressure regulating valve on line 4, 4, Fig. 5. Fig. 5 is a section of the same, on line 5—5 of Fig. 4. Fig. 6 is an enlarged view of a fragmentary portion of the contact shoe. Fig. 6$^a$ is a modified construction of connection between arm 22 and member 32. Fig. 7 is an enlarged view of a portion of the pressure cylinder and mechanism actuated thereby for elevating or extending the frame.

Referring to said drawings, 1 and 2 are rock shafts which are supported in bearings 3, 3 and 4, 4 which are, respectively, secured to the side bars or rods 5 and 6, and which said bars and the transverse tension members 7, 7 which are arranged to make the frame more rigid, constitute the frame support for the apparatus, the said frame support being suitably secured to insulators 8, 8, 8, 8 at each end thereof. Upon the ends of said rock-shafts, 1 and 2, are rigidly secured the lower members of an extensible-collapsible frame, which are adapted to be swung in the arc of a circle in opposite directions, the said lower members comprise, preferably, curved hollow pipes or tubes *a, b* and *c, d*. The lower ends of said tubes *a, b* are secured in sockets *e* formed in the upper end of plates 9, 9 the lower ends of which, respectively, are provided with bosses having an orifice in which the ends of said shaft 1 project, the plates being rigidly fastened on said shaft. The upper ends of said tubes *a, b* are secured in sockets formed in the lower end of the connecting plates 10, 10, in the outer ends of which an orifice is formed in which the ends of the rod 11, which extends transversely of the apparatus, are securely fastened, the said rod serving to connect the two sets of tubes *a, b*. The said tubes *a, b* when connected by said rod 11 forms one side of the lower members of said collapsible frame, the remaining lower members comprise the tubes *c, d* and are of identical construction with those described, the lower ends thereof being secured in plates 12, 12 which are similar in construction to plates 9, 9, and are rigidly fastened upon the ends of shaft 2. The upper ends of the tubes c, d are fastened to connecting plates 13, 13, which are similar in construction to plates 10, 10 and are connected by a rod 14 in identically the same manner as in the case of tubes a, b.

It will be observed that the tubes a, b, c, d, conjoined as described, constitute the lower members of the extensible frame, the upper members of which comprise the arms 15, 15, 16, 16, preferably formed of tubing, the lower ends of which, respectively, are secured in the L-shaped sleeves 17, 17, 18, 18, which are, respectively, loosely mounted on the rods 14 and 11. The upper ends of said arms 15, 15, 16, 16 are pivotally secured upon the rod 19 which extends transversely of the machine, and which serves to connect the said arms at both sides of the apparatus. The upper arms 15, 15, 16, 16, are braced together in a suitable manner by a rod or preferably tubing or pipes 15', 16', for strengthening the frame structure. For the purpose of effecting corresponding rotation of shafts 1 and 2 in opposite directions, bars 26 and 27 connect with their respective ends upper and lower points of yokes 38. A star shaped plate 20 is arranged at the ends of said rod 19, the upper prong or member having a clevis f in which the ends, respectively, of the shaft is seated, the two prongs at right angles to said clevis are provided with oblong slots g, g in which pins h, i, which are, respectively, secured upon the ends of the arms 15, 15, 16, 16 project; the downwardly projecting prong of the plate is provided with a slot j in which a pin k projects attached to the outer bearing portions 24, 25, which are rigidly fastened to a hollow shaft 19' slid over the connecting rod 19 and serving as base for carrying said bearing portions to which the contact members or shoes 23, 23 are hinged. The function of these plates is to securely hold the contact members in a straight upright position and prevent them from tilting over as such might tend to take place, since the contact base or shaft 19' is rotatably fitted over connecting rod 19. Four bearing members 24, 24, 25, 25, are rigidly mounted upon the said hollow shaft 19' at points equidistant from the end, to which are hinged two pairs of arms or levers 21, 21, 22, 22, which carry at their upper ends the contact shoes 23, 23, the said arms 21, 21 being connected to one of said shoes and the arms 22, 22 to the other of said shoes, the said arms being capable of being deflected in opposite directions, that is, the arms 21, 21 in a direction opposite to that of the arms 22, 22. The said levers 21, 21, 22, 22, are connected to a cross piece x, which is pivotally connected to the shoes at z, the cross piece being pivotally connected to the arm on the lever 22 at y, as shown in Figs. 6 and 6ª. The object of this universal hinge arrangement is to allow the contact shoes to accommodate themselves with the broad contact surface readily to the trolley wire when same is deflected from the true horizontal line. The lower ends of arms 21 and 22 carry pins 20', 21' by means of which they are mounted on the said bearing members 24, 24, 25, 25. Each pair of arms with the respective contact shoe attached are held in an inclined position in opposite direction by means of coiled tension springs 29, 29 acting upon said arms, and stops r, s, arranged in the spring casing to limit the throw of said arms. The outer ends of springs, 29, 29, are fastened to the stops s, of the part of the spring casings, 28, 28, rigidly connected to the arms, 21, 22, the inner ends of the springs 29, 29, being fastened to bearing portions 24, 25, said bearing portions having plates which constitute the other half of the spring casings, 28, 28, and stops r carried by said plates for the purpose before stated. The purpose of this construction is to cause the arms 21, 22 to be deflected or swung on their pivotal connections in an opposite direction when pressure is applied upon the top of the shoes carried by said arms, as for instance when the shoes are forced in contact with the trolley wires thereby causing lateral shifting or sidewise movement of the shoes over the wire. The tension of the springs 29, 29 is adjusted to keep the contact members or shoes at all instances in close contact with the trolley wire or wires (not shown) without producing excessive pressure upon or against said wire or wires. The purpose of this construction is to keep the shoes in contact with the trolley wires with the least practicable pressure so as to reduce the wear of the shoes and trolley wires to a possible minimum, the lateral shifting movement in opposite directions of the contact members produces the greatest possible wearing contact surface, thus preventing the wearing of a groove, or indentation in the shoe or contact member by the wire, and an early destruction or wearing out of the contact shoe in consequence.

The contact shoes are of a design to make them light as possible by being sufficiently durable and therefore aluminum or some other suitable material is preferably employed for its construction. The same applies to the levers or arms carrying the contact shoe in order to omit as much as possible dead weight in the working parts, and make the contact shoes quick in their action to follow the trolley wire. Each contact shoe consists of a preferably U-shaped middle portion 32 to which wearing strips 32' are fastened in a suitable manner to allow their easy removal when desirable. The said shoes terminate in end pieces or extensions 33, which are rigidly secured to the ends of the middle portion 32 to form bow shaped contact shoes 23, 23 sufficiently long to prevent the wire from leaving them at curves. The width of the shoe and wearing strips depends upon the required contact surface for carrying the current load. The tension of the springs 29, 29, as before stated, is sufficient to keep the contact members or shoes, in contact with the wires without excessive and harmful pressure; and in order to prevent any greater pressure than that created by said springs being exerted against the wires, by or through the means which elevates the extensible frame, a small cylinder 30, in which a piston valve, 31, is seated, is pivotally connected to one of the short shafts or pins, 20', by means of a link 20'', and the free end of the stem of rod 31', of the valve 31, is connected to the lower extension of one of the arms 22, whereby should the normal pressure exerted by the elevating means upon the wire be increased, the said springs, 29, 29, will be compressed and the arms 21 and 22 deflected sufficient to cause both the piston rod 31' and cylinder 30, in which it is operably seated, to move in opposite directions, thereby throwing the vertically disposed channels, N, N', in the valve 31, out of alinement with, respectively, the ports m and o, thereby cutting off any further pressure from the reservoir to the cylinder 34. A greater pressure exerted upon said springs would produce a further deflection of said arms 21 and 22 and bring the port m', in the outer end of the valve opposite to the port o, whereby the pressure in the cylinder 34, would be exhausted through the members 50, a, 49, 16', 36, the channels Q' and port m', then in alinement with port o, into the atmosphere, the pressure from the reservoir to the cylinder being at the same time shut off, since port m is closed by piston body, 31, due to the new position of the piston, thus permitting the frame to be quickly collapsed. The retraction of springs, 29, when pressure is withdrawn from cylinder 34, and the main frame partially collapsed, operates the piston valve to shut off port o, thus preventing any further air being exhausted from cylinder 34, and the main frame from being further collapsed. If now the feed wire should rise to a greater height above the tracks, this would permit the springs, 29, to retract thereby bringing the piston again into the position shown in Fig. 5 and reëstablishes normal pressure in the cylinder 34, and puts the support actuated by pressure from the cylinder in normal operative position. The purpose of this construction is to automatically regulate and control the pressure upon the trolley wire, and likewise regulate the pressure exerted to elevate the extensible frame to correspond with the predetermined pressure of the contact members upon the trolley wires, it also serves to hold or maintain the frame in a fixed position with relation to the trolley wires. For the purpose to instantly collapse the main frame without regard to the said automatically operated valve, a bypass has been arranged consisting of a channel in which a valve body t is fitted and pressed to its seat by spring u. Under normal conditions, this valve is closed since the supply pressure in addition to the said spring keeps the valve body tightly upon its seat. However, if it is desired to instantly collapse the apparatus by cutting off the supply pressure, the back pressure from cylinder, 34, conducted through members, 50, a, 49, 16', 36, the channel Q' and port o, will force the valve body t from its seat and let the fluid pass out through channels m and o and members, 35, 15', 47, d, 48, and the main exhaust valve (not shown) operated by the motorman, into the atmosphere. The said cylinder 34 by means of which and its connected mechanism, the extensible-collapsible frame is elevated, is located between the shafts 1 and 2, being connected with shaft 1 by means of the crank 37 mounted on said shaft between the members n, o of the yoke 38; the members n, o of said yoke being rigidly secured upon said shafts, respectively. The said yoke is provided with the projections or stops p, q, which limits the movement of said cranks 37, and with a cylindrical portion 39 in which a socket is formed to receive one end of the coil springs 40, the lower end of which, respectively, is seated over the projection 41 on each of said cranks.

The upper ends of the cranks are, respectively, pivotally connected to the piston 42 of the cylinder 34 and to the link 43, so that when pressure is admitted to said cylinder through conduit 36, the piston head 44 is forced forward and the piston backward, causing the cranks to swing in the arc of a circle, thus compressing the springs 40, until the movement of the cranks are finally arrested by the projection p on yoke 38, thereby turning shafts 1 and 2 and elevating the extensible frame; meanwhile the upward movement of the cylinder caused by the rotation of the cranks carries the frame then resting upon the cylinder, upwardly as shown in Fig. 7, in dotted lines. This arrangement has been provided in order that if the device is fully collapsed it will be dropped so low as to take up the least possible height, and without the assistance afforded by the upward movement of the cylinder 34 it would be difficult to start the upward movement of the frame. The rotation of shafts 1 and 2 during the elevation of the extensible frame compresses the coil springs 45 mounted on shafts 1 and 2 at opposite ends, the said springs being surrounded by caps 46, the function of said springs being to assist the downward movement or collapse of the frame; the retraction of the springs supplementing the force of gravity in accomplishing this purpose. The fluid pressure for operating the main frame is preferably drawn from a suitable storage tank, and is supplied to and exhausted from the mechanism in any suitable manner under the control of the operator for the purpose of extending and collapsing the frame at the will of said operator. The area of the pressure cylinder 34 is preferably proportioned to a certain pressure sufficient to elevate the frame, which pressure is much less than is carried in the supply tank, thus leaving always an excess supply of pressure at disposal to insure quick and exact operation.

For conducting the fluid pressure to the operating cylinder, a passage has been provided from the roof of the car or locomotive to the governing valve 30 and from this valve to operating cylinder 34.

Advantage is taken of some of the hollow members of the frame structure for forming these fluid passages. As clearly shown in the drawings, the members $d$ and 15 in conjunction with the flexible joint sections 48, 47, 35, and members 16 and $a$ in conjunction with the flexible joint sections 36, 49, 50, provide these fluid passages respectively.

In order to prevent the valve body and the fluid passages from freezing during cold weather a portion of the electric current passing through other portions of the frame may be shunted into these members in such way as to make them conductors like the other portions of the frame for conveying electric current to the motors. The heating effect of the electric current will thus be utilized to keep these portions heated to an extent sufficient to prevent freezing during cold weather. The flexible connection 48 through which air is admitted to the frame is made of rubber. The other flexible connections are made of flexible metallic hose and are capable of conveying electric current. The electric current is transmitted through the frame to the car motors in the usual manner.

The operation of the device is sufficiently disclosed in the foregoing description and need not be further described.

The advantage of my improved apparatus will be manifest to those skilled in the art; it may be pointed out, however, that the construction produces a device in which the lower members of the extensible frame are of greater length than the upper members; that the vibrating arms directly supporting the contact members are sufficiently sensitive to take up the smallest vibrations of the trolley wire.

The apparatus described is of a type which is normally in a collapsed position and fluid pressure serves to extend the main frame and hold it in operating position. An apparatus of this character is considered most efficient and reliable in operation.

Having described my invention, what I claim and desire to secure by Letters Patent is:—

1. In a trolley support, the combination of a collapsible frame, means to elevate and lower said frame, a contact member carried by said frame laterally movable independent of the frame, means independent of the frame to shift said contact member in lateral direction, means to keep said contact member in contact with the feed wires, and means operated by the contact member to regulate the pressure exerted to elevate the frame to correspond with the pressure of the contact member upon the feed wires.

2. In an overhead supply conductor for electric railways, the combination of a collapsible frame and a current collector carried thereby, comprising a plurality of members movable in opposite directions independent of the frame, and means independent of the frame to move said contact members.

3. In an overhead supply conductor for electric railways, the combination of a fluid pressure actuated trolley support, comprising tubular members constituting conduits to carry pneumatic pressure to elevate said support, a contact member carried by said support laterally movable independent of said support, means independent of the frame to laterally move said contact member, means to keep said contact member in contact with the feed wires at a predetermined pressure, and means operated by the contact member to regulate the pressure exerted to elevate the frame to correspond with the pressure of the contact member upon the feed wires.

4. In an overhead supply conductor for electric railways, the combination of a collapsible fluid pressure actuated trolley support, comprising tubular members which constitute conduits to carry pneumatic pressure to elevate said support, a plurality of contact members carried by said support and laterally movable independent of the support, means to move said contact members laterally, means to keep said contact members in contact with the feed wire at a predetermined pressure, and means operated by the contact members to regulate the pressure exerted to elevate the frame to correspond with the pressure of the contact members upon the feed wire.

5. In an overhead supply conductor for electric railways, the combination of a fluid pressure actuated collapsible trolley support, comprising tubular members which constitute conduits to carry pneumatic pressure to elevate said support, a plurality of contact members carried by said support, said members being movable laterally in opposite directions to each other and independent of the frame, means to shift said members in a lateral direction opposite to each other, means to keep said contact members in contact with the feed wire at a predetermined pressure, and means operated by the contact members to regulate the pressure exerted to elevate the frame to correspond with the pressure of the contact members upon the feed wire.

6. In an overhead supply conductor for electric railways, the combination of a fluid pressure actuated collapsible trolley support, comprising tubular members which constitute conduits to carry pneumatic pressure to elevate said support, the said tubular members being also electric conductors to carry current from the feed wires to motor, a contact member carried by said support and laterally movable independent thereof, means to move said contact member laterally independent of the support, means to keep said contact member in contact with the feed wire at a predetermined pressure, and means operated by the contact member to regulate the pressure exerted to elevate the support to correspond with the pressure of the contact member upon the feed wire.

7. In an overhead supply conductor for electric railways, the combination of a fluid pressure collapsible trolley support, comprising tubular members which constitute conduits to carry pneumatic pressure to actuate said support, the said members being also conductors to convey electric current from the feed wires to the motor, means connected with said tubular members to elevate said support, a plurality of contact members carried by said support and laterally movable independent thereof, means to move said contact members laterally independent of the support, means to keep said contact members in contact with the feed wire at a predetermined pressure, means operated by the contact members to regulate the pressure to elevate the support to correspond with the pressure of the contact members upon the feed wire.

8. In an overhead supply conductor for electric railways, the combination of a collapsible trolley support, a contact member carried by said support laterally movable independent of said support, means interposed between said support and the laterally movable contact member to hold said contact member in contact with the feed wire at a predetermined requisite pressure, means controlled by said laterally movable contact member to hold the support in normal operative position and to prevent the exertion of more than sufficient pressure to hold said support in said normal position, and means independent of said last mentioned means to quickly collapse said support.

In testimony whereof, I have hereunto signed my name in the presence of two subscribing witnesses.

HERMANN SCHÜTTE.

In the presence of—
   CLARENCE A. WILLIAMS,
   E. J. R. BLAKELY.

Copies of this patent may be obtained for five cents each, by addressing the "Commissioner of Patents, Washington, D. C."